United States Patent
Kallugudde (10) Patent No.: US 12,047,505 B2
(45) Date of Patent: Jul. 23, 2024

(54) SECURE DATA TRANSFER

(71) Applicant: Mastercard International Incorporated, New York, NY (US)

(72) Inventor: Manu Dharmaiah Kallugudde, Maidenhead (GB)

(73) Assignee: Mastercard International Incorporated, New York, NY (US)

( * ) Notice: Subject to any disclaimer, the term of this patent is extended or adjusted under 35 U.S.C. 154(b) by 283 days.

(21) Appl. No.: 17/111,324

(22) Filed: Dec. 3, 2020

(65) Prior Publication Data

US 2021/0176060 A1    Jun. 10, 2021

(30) Foreign Application Priority Data

Dec. 4, 2019  (EP) .................................. 19213485

(51) Int. Cl.
*H04L 9/32* (2006.01)
*G06Q 20/38* (2012.01)

(52) U.S. Cl.
CPC ..... *H04L 9/3213* (2013.01); *G06Q 20/38215* (2013.01); *H04L 9/3228* (2013.01); *H04L 9/3234* (2013.01); *H04L 2209/56* (2013.01)

(58) Field of Classification Search
CPC ... H04L 9/3213; H04L 9/3228; H04L 9/3234; H04L 2209/56; G06Q 20/38215
See application file for complete search history.

(56) References Cited

U.S. PATENT DOCUMENTS

| | | | |
|---|---|---|---|
| 10,404,703 B1 * | 9/2019 | Peterson | ................ G06Q 30/06 |
| 2010/0327054 A1 | 12/2010 | Hammad | |
| 2013/0262858 A1 | 10/2013 | Neuman et al. | |
| 2013/0332344 A1 | 12/2013 | Weber | |
| 2015/0127547 A1 | 5/2015 | Powell et al. | |
| 2017/0221056 A1 | 8/2017 | Karpenko et al. | |
| 2017/0373852 A1 * | 12/2017 | Cassin | ................... G06Q 20/14 |
| 2018/0025354 A1 | 1/2018 | Groarke et al. | |
| 2019/0318345 A1 | 10/2019 | Kallugudde | |
| 2020/0027078 A1 | 1/2020 | Kallugudde et al. | |
| 2020/0090184 A1 | 3/2020 | Kallugudde et al. | |

FOREIGN PATENT DOCUMENTS

| | | | | |
|---|---|---|---|---|
| EP | 1773018 A1 * | 4/2007 | ........... | G06F 21/305 |
| WO | WO-2014081494 A1 * | 5/2014 | ......... | G06Q 20/3821 |

OTHER PUBLICATIONS

Zouina, et al.; Towards a Distributed Token Based Payment System Using Blockchain Technology; 2019 International Conference on Advanced Communication Technologies and Networking (CommNet); 2019. DOI: 10.1109/COMMNET.2019.8742380.

* cited by examiner

*Primary Examiner* — Izunna Okeke
(74) *Attorney, Agent, or Firm* — Pramudji Law Group PLLC; Ari Pramudji (57) ABSTRACT

The present invention discloses a method of processing a data transfer request securely over a network, the method comprising the steps of obtaining, by a first entity, a first token associated with sensitive data received from a user; associating the first token with a token reference and storing the token reference; sending the token reference to a second entity; requesting a second token from a second entity upon receiving a data transfer request from a third entity, wherein the second token is derived from the first token using an ad hoc logic; and processing the data transfer request using the second token.

14 Claims, 6 Drawing Sheets

SECURE DATA TRANSFER

FIELD OF INVENTION

The present invention relates to a method of securely processing a data transfer request involving sensitive data over a network. More specifically, the invention relates to making an online transaction more secure by masking the sensitive data transmitted over the network.

BACKGROUND

In systems involving several data processing devices connected over a network, a sensitive data payload is often needed to be passed between these data processing devices. Typically, the party or parties seeking to protect the sensitive data do not have control over at least some of the network links over which the sensitive data payload is transmitted, e.g. in the case where a network link involves a public network component such as a transmission over the internet. The trust level of such links may be less than ideal, which can enable an unauthorized party to intercept communications over these links, e.g. in a 'man in the middle' attack.

One example of a system where this consideration comes into play is a system that implements a payment transaction between a merchant and a customer using a payment card or device. The merchant needs to contact an authentication entity on the network to receive a token, which then acts as customer's payment credentials. The authentication entity generates the token and sends the token back to the merchant. In a 3D secure transaction, known in the art, the token is static and often stored by the merchant for processing future transactions. Therefore, the security of the transaction is limited.

An unauthorised party, referred to herein as an eavesdropper, seeking to perpetrate fraud may be able to leverage any insecure points within the network path so as to intercept the token as it is passed from the merchant to the payment network. This may be achieved by a 'man in the middle' attack where the unauthorised party extracts data from a communication session between two authorised parties so as to gain access to data transmitted in the communication session. With the limited security provided by the static token, a fraudster can perform replay attacks or can act as a legitimate merchant.

Another example of a system where this consideration comes into play is in an Internet of Things (IoT) system. An authentication server may control access to an IoT network that has a primary node and one or more secondary nodes. The secondary nodes may need to provide authentication credentials in order to successfully join the IoT network, where the secondary node obtains an authentication credential from the primary node over a network link that may not be secure. A man in the middle attack could cause the primary node to transmit the authentication credential to an unauthorised node instead of, or in addition to, the secondary node, potentially enabling the unauthorised node to gain access to the IoT network.

In the first example of payment transaction, one way of ensuring the security of transaction is for the issuer to verify the transaction and the merchant, followed by consumer authentication. The issuer may pose one or more security questions or use other means to verify that the transaction is made by a genuine customer. This solution however requires use of additional network and device resources, which may not be justified if the transaction is actually made by the genuine customer. Moreover, this also delays the processing of the transaction. Furthermore, as the customer is required to perform an extra step for the transaction to get approved, the overall user experience is negatively affected.

Therefore, the present invention is aimed at resolving one or more of the problems mentioned above and in particular processing a transaction in a reliable, secure, and timely manner.

SUMMARY OF THE INVENTION

According to an aspect of the invention, there is provided a method of processing a data transfer request securely over a network. The method comprising obtaining, by a first entity, a first token associated with sensitive data received from a user; associating the first token with a token reference and storing the token reference; sending the token reference to a second entity; requesting a second token from a second entity upon receiving a data transfer request from a third entity, wherein the second token is derived from the first token using an ad hoc logic; and processing the data transfer request using the second token.

Advantageously, sensitive data can be transferred in a more secure and reliable manner using the second token which is an ultra-low value token only used for a single transaction.

Preferably, the method further comprises requesting a cryptogram from the second entity when requesting the second token.

Preferably, the method further comprises sending, by the first entity, the second token and the cryptogram over a public network; validating, by the second entity, the second token and the cryptogram received over the public network; detokenizing, by the second entity, the second token to retrieve the sensitive data; and sending, by the second entity, the sensitive data to a fourth entity configured to approve the data transfer request.

Preferably, the fourth entity is configured to optionally authenticate the user before approving the data transfer request.

Preferably, the method further comprises sending, by the fourth entity, a confirmation of approval of the data transfer request to the first entity and/or the third entity.

Preferably, the second token comprises data transmitted in an electronic message having a card number, an expiry date and a CVV field.

Preferably, the ad hoc logic comprises splitting the first token into three parts and masking at least two of the three parts to generate the second token.

Preferably, the second entity is configured to store the ad hoc logic and update it each time the second token is generated.

Preferably, the second token has a predefined expiry period.

Preferably, the method further comprises the second entity verifying credentials of the first entity before issuing the second token.

According to another aspect of the invention, there is provided a system for processing a data transfer request securely over a network, the system comprising a first entity configured to generate a first token associated with sensitive data received from a user, associate the first token with a token reference and store the token reference, send the token reference to a second entity, request a second token from a second entity upon receiving a data transfer request from the user, the second token has been derived from the first token using an ad hoc logic, and process the data request using the second token.

Preferably, the first entity is further configured to receive a cryptogram and the second token from the second entity, and to send the second token and the cryptogram over a public network.

Preferably, the first entity is a merchant and the second entity is a tokenization platform.

Preferably, the data transfer request is a payment transaction between a merchant and a user.

BRIEF DESCRIPTION OF THE DRAWINGS

Embodiments of the present invention are described below, by way of example only, with reference to the accompanying drawings, in which.

DETAILED DESCRIPTION

As used herein, the followings terms have the following meaning:

Sensitive data: data that should be exposed in cleartext form to authorized entities only. Examples of sensitive data include a Primary Account Number (PAN), a private key, and an authentication credential.

Token: an entity that acts as a placeholder for a corresponding item of sensitive data, where typically the token is generated in some predictable manner from the sensitive data item such that entities in possession of the knowledge of how the token was generated can obtain the sensitive data from the token. An example of a token is an alphanumeric string that is generated based on a PAN.

Cryptogram: Dynamic data for transaction to ensure domain controls and to perform transaction validations.

Secure storage medium: a storage medium that only authorized entities can retrieve data from. An example of a secure storage medium is a data store that is accessible only via a private network or virtual private network. Access may be granted only upon provision of an authentication credential, e.g. a password. A secure storage medium may include one or more encrypted volumes.

Eavesdropping: the act or process of infiltrating a communication channel so as to intercept data transmitted over said channel, as committed by a party that is not authorized to gain access to data transmitted over said channel. Eavesdropping is typically a fundamental part of a man in the middle attack.

Trusted channel: a communications path that is hardened against attempts to gain access by unauthorized third parties, e.g. by eavesdropping. A virtual private network (VPN) or a private network are examples of trusted channels.

Public network component: a network component such as a switch, router, server, etc. that is accessible by any data processing device. Typically, little or no authentication is required to access a public network component.

Various aspects of the invention are now described with reference to the accompanying drawings. The description and specific examples included herein are intended for purposes of illustration only and are not intended to limit the scope of the present disclosure.

Payment accounts are widely used by customers to fund transactions for products at merchants (e.g., transactions for goods, services, etc.). To avoid issues related to fraudulent and/or unauthorized transactions, issuers associated with the payment accounts and payment networks associated with processing the transactions often impose added authentication and validation techniques/services for the customers initiating the transactions. Traditionally, though, such authentication and validation techniques are only utilized in card-present transactions.

However, increasingly added authentication and validation techniques are being utilized for e-commerce transactions, which are more generally card-not-present, or CNP, transactions. Examples of such CNP transactions are online purchases made over the internet or phone, payments made by mail or fax.

Figure 1:
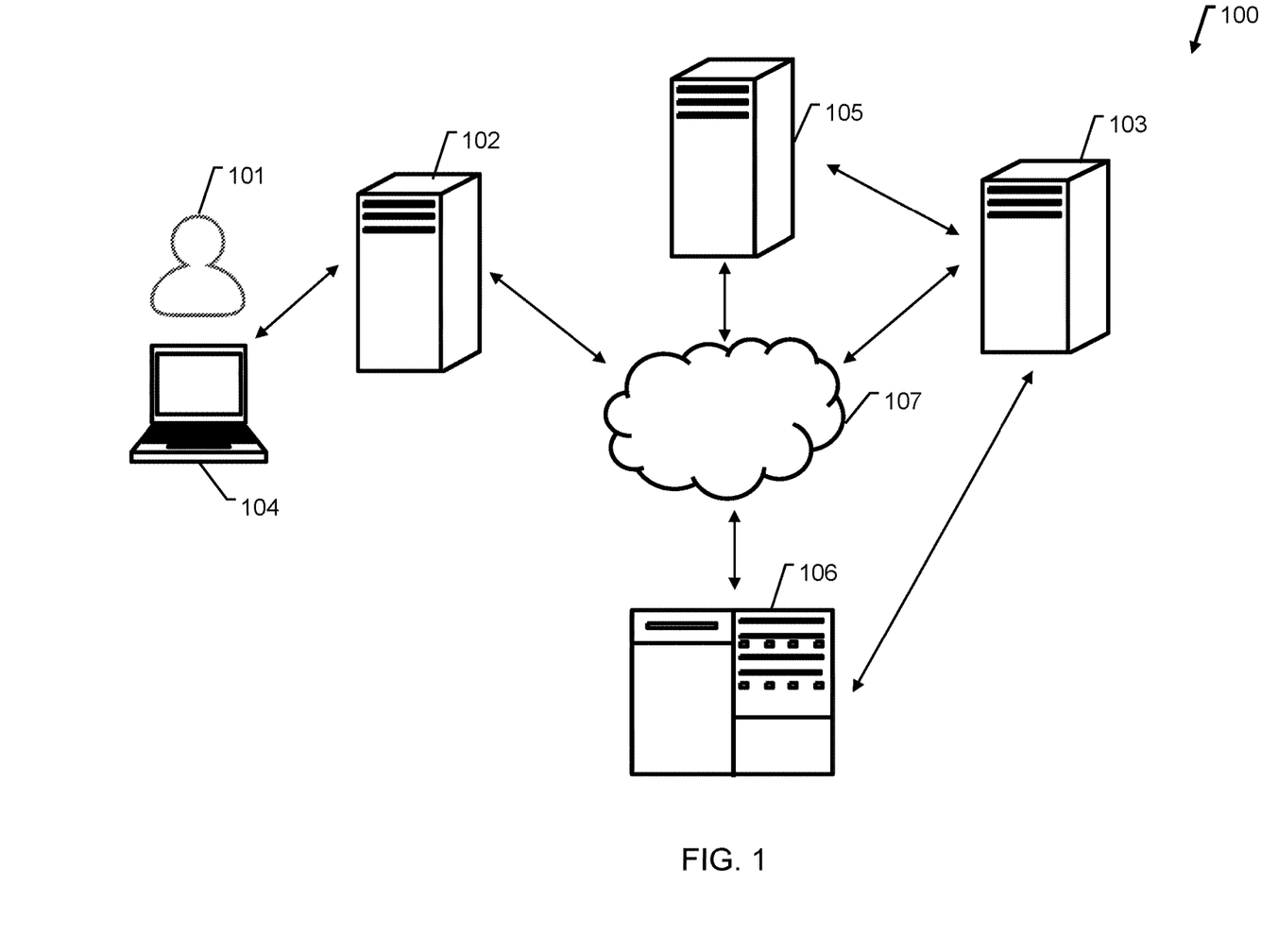
FIG. 1 shows a system for authenticating and approving a transaction between a customer and a merchant in accordance with an aspect of the invention.

FIG. 1 illustrates an exemplary system 100 for implementing a process that may be utilized for authenticating and verifying a customer in connection with a transaction by the customer, and which is consistent with the EMV® 3-D Secure™ protocol/specification, for example. It should be appreciated, however, that not all details of the EMV® 3-D Secure™ protocol/specification are discussed herein, since a complete detailed disclosure of such information may be readily understood by referencing the EMV® 3-D Secure™ protocol/specification and or discussions thereof. In addition, the illustrated system 100 includes a plurality of entities that interact with each other by exchanging multiple, specifically formatted messages over secure communication channels (e.g., as defined in the EMV® 3-D Secure™ protocol/specification (see, e.g., https://www.emvco.com/emv-technologies/3d-secure/), etc.). Accordingly, and as can be appreciated, the authentication illustrated in FIG. 1 is complex given the number and extent of entities, messages, and other requirements necessarily involved.

In one aspect of the invention, the system 100 includes a customer 101 associated with a payment account, where the payment account is issued to the customer 101 by an issuer 103 and is useable by the customer 101 to fund purchase transactions with one or more merchants, e.g., merchant 102. The customer 101 may hold a payment card issued by the issuer 103 for making purchase transactions. The customer 101 may also be associated with a computing device 104, which is configured to access one or more virtual merchant locations. The computing device 104 may include, for example, a tablet, a smartphone, a laptop, a desktop, or other similar electronic device, which enables the customer 101 to interact and/or communicate with the merchant 102.

Also, the computing device 104 may include a wallet application (not shown), which is configured to provide payment account credentials for the customer's payment account, for example, in connection with payment account transactions. In this embodiment, the wallet application includes a virtual wallet application, which may include, without limitation, Masterpass® from Mastercard®, Apple Pay® from Apple®, Visa Checkout®, Google Pay® from Google®, etc. Upon installation and/or activation, the wallet application, and more generally, the computing device 104, is provided with and/or provisioned with a public/private key pair or one or more symmetric keys for use as described below, to generate cryptograms per transaction performed by the customer 101 using his/her payment account (through the wallet application). The keys may be provided by a digital service server (DSS) 105, or a payment network, e.g., payment network 106, or otherwise, etc. Details of the computing device 104 and other computing devices identified herein (e.g., authentication devices, servers, etc.) are described more fully below, with reference to FIG. 4.

The merchant 102 in the system 100 preferably includes a virtual merchant having a virtual merchant location, such as, for example, a website, a network-based application, etc., which is accessible by the customer 101 via the computing device 104. The merchant virtual location may be managed and/or provided directly by the merchant 102, or by another entity on behalf of the merchant 102, etc.

In general, in the system 100, the customer 101 has previously accessed and/or interacted with the merchant 102 at the virtual merchant location, whereby the merchant 102 includes a profile for the customer 101, which includes payment credentials for the customer's payment account. In connection therewith, the merchant 102, or other entity, is configured to request a token from the DSS 105 in connection with generating the profile for the customer 101, for example, for later use in connection with a payment account transaction by the customer 101 at the merchant 102. The DSS 105 includes, in this exemplary embodiment, the Mastercard™ Digital Enablement Service (MDES) server, but may include one or more other servers in other embodiments, etc. In any case, in response to such token request, the DSS 105 generates a static token specific to the customer's payment account and maps the token to a primary account number (PAN) for the payment account (e.g., in a data structure associated with the DSS 105, etc.). The DSS 105 further returns the token to the merchant 102, directly or via the virtual wallet application at the computing device 104, whereby the merchant 102 then stores the token in association with the customer's profile for later use by the customer 101 in future transactions with the merchant 102 (e.g., "on file," etc.). For subsequent transactions with the customer 101, the merchant 102 may then use the static token to identify the funding payment account for the transaction.

Alternatively, the DSS 105 may generate and provide a static token to the virtual wallet application in the computing device 104, which in turn, stores the token therein. Then, for a subsequent transaction, the virtual wallet application provides the token as stored therein, rather than relying on the token "on-file" at the merchant 102. Further, for subsequent transactions, the customer 101, or the virtual wallet application in the computing device 104, may directly provide an account number (e.g., a PAN, etc.) to fund the further transaction, instead of relying on the token "on-file" at the merchant 102 or the token provisioned to the virtual wallet application.

Specifically, in the system 100, when the customer 101 browses one or more products (e.g., goods, services, etc.) at the merchant 102, via the computing device 104 and at the merchant's virtual location, the customer 101 may select to purchase a product and further provide details related to the transaction and an input at the computing device 104 to then checkout, via a public network 107 such as the internet. The checkout details and input, received from the customer 101, may include, for example, a selection of the payment account corresponding to the token already received and stored at the merchant 102. Or, the checkout details and input may include the customer 101 providing a token, an account number for the same payment account (for which the token has already been received), or an account number for a different payment account, and/or other details of the transaction.

In response to the checkout input (and/or details provided in connection therewith), the merchant 102 is configured to interact with the computing device 104, whereby the computing device 104, as configured by the wallet application (not shown), generates a cryptogram based on the public-private key pair, or on the symmetric key (e.g., a secret key generated by a symmetric algorithm, etc.), which is associated with the customer's payment account and wallet application (and known to or shared with the DSS 105, for example). The cryptogram may be generated by the virtual wallet application, locally at the computing device 104 (e.g., a digital secure remote payment (DSRP) generated by the wallet), or it may be generated based on one or more interactions with other systems (e.g., a digital secure remote payment (DSRP) service incorporated into the DSS 105, or other system(s), etc.) and provided to the merchant 102 via the virtual wallet application. In this example, the cryptogram also includes the details of the merchant such as merchant ID, type, address, etc. The cryptogram is unique to each transaction and is dynamically generated for each new transaction between the customer 101 and one or more merchants 102. The cryptogram may also include the information such as merchant ID, name, address, and the nature of transaction. Therefore, the cryptogram provides an added layer of security to the transaction. The computing device 104, as configured by the wallet application, transmits the cryptogram to the merchant 102.

In this example, the merchant 102 transmits the static token and the cryptogram, from the DSS 105 via a directory server (not shown) over the network 107. The DSS 105, in turn, is configured to decrypt or detokenize the received token to map it to the account number (e.g., the PAN, etc.) for the customer's payment account and to generate a directory server nonce (DSN). The DSN may include a number, for example, an unpredictable number, utilized to provide entropy into the Accountholder Authentication Value (AAV) and/or an issuer authentication value (IAV) associated therewith. In addition, the DSS 105 is configured to validate the received cryptogram for the transaction (i.e., perform a cryptographic key validation). Specifically, the DSS 105 is configured to diversify a master key from the issuer master symmetric key (e.g., a key generated, by the DSS 105, for the issuer 104, etc.) and then to diversify one or more session keys from the master key (e.g., based on the ATC maintained by the DSS 105, etc.). The DSS 105 is configured to use the session key(s) to validate the cryptogram received from the directory server.

The DSS 105 is also configured to return the account number and the DSN back to the directory server. Thereafter, when the directory server receives the account number from the DSS 105, the directory server 118 may be configured to compress certain data associated with the transaction. For example, the directory server may be configured to determine a logarithm of the transaction amount (i.e., a log amount), thereby compressing data used to present the amount (e.g., a six byte value for the amount may be encoded in two bytes with a potential error of less than +/−0.02%, etc.). The directory server may further be configured to determine a truncated hash of the merchant ID for the merchant 102, again, thereby compressing the data used to represent the merchant ID. With that said, it should be appreciated that the directory server 118 may be configured to apply one or more different techniques to compress data to be used herein, or not, in other embodiments.

The directory server is configured to then provide the account number, the DSN, the log amount, and the truncated hash of the merchant ID along with the validation result, via the network 107, to an access control server (ACS) (not shown) which is a server operated by the issuer 103, or on behalf of the issuer 103, as defined by the 3-D Secure™ specification implemented in this embodiment.

The ACS is configured to then generate the IAV based on a key(s) shared with the issuer 103, a cryptographic technique (e.g., a keyed hash (HMAC) function, etc.), and one or more of the account number, the DSN, the log amount, and the truncated hash of the merchant ID, or other data, etc. The ACS is configured to then generate a response including the IAV and transmit the response to the directory server.

Upon receipt of the IAV from the ACS, the directory server is configured to generate a message authentication code (MAC) for the full AAV (i.e., the data to be included in the AAV (e.g., the DSN, the log amount, the truncated hash of the merchant ID, a currency code, a key ID, etc.)), and then to compile a full AAV. The full AAV includes the IAV, the DSN, the amount and merchant information, and the signature information (e.g., the key ID and the MAC), the validation flag, etc. It should be appreciated that data included in the full AAV may vary based on the particular implementation thereof, whereby the full AAV may include more or less data, but will generally include the IAV from the ACS.

Thereafter, the directory server is configured to provide the full AAV to the merchant 102, again via the public network 107. In turn, the merchant 102 is configured to compile an authorization request for the transaction, which includes the token or the account number for the customer's payment account, as appropriate, and also the full AAV. The merchant 102 is configured to then transmit the authorization request to an acquirer (not shown). The acquirer in turn, is configured to transmit the authorization request to the payment network 106.

Upon receipt of the authorization request, the payment network 106 may be configured to interact with the DSS 105 (although this is not required in all embodiments (e.g. where the payment network 106 knows the appropriate key(s), etc.)). Specifically, the payment network 106 may be configured to validate the MAC included in the full AAV and/or the full AAV itself. The payment network 106 may further be configured to otherwise validate and/or confirm the full AAV, or part thereof, for example, based on version information included in the full AAV.

Once validated, the payment network 106 is configured to provide the authorization request, or parts thereof, to the DSS 105. The DSS 105 is configured to confirm the validation of the cryptogram based on the DSN, when the DSRP cryptogram was previously validated by the DSS 105. Conversely, the DSS 105 is configured to locate the DSRP data for the transaction, by use of the DSN and to validate the DSRP data, as described above. In addition, the DSS 105 is also configured to decrypt and map the token included in the authorization request, if any, to the corresponding account number (e.g., PAN, etc.).

The DSS 105 is configured to then return the account number and a validation result to the payment network 106. In connection with the above, the payment network 106 and/or the DSS 105 may be further configured to provide additional services to the transaction based on the payment account and/or the customer 101. For example, the DSS 105 may be configured to determine if one or more usage requirements of the token is satisfied (e.g., the token is permitted to be used in e-commerce, etc.), or, optionally, to check the transaction amount, name of the merchant, and currency, etc.

Thereafter, the payment network 106 is configured to provide the authorization request (including the account number and the validation result) to the issuer 103. Then, the issuer 103 is configured to determine if the transaction should be approved or declined, and to respond accordingly, through the payment network 106. To do so, the issuer 103 is configured to validate the IAV based on one or more shared key(s) with the ACS. The IAV, more specifically, may be validated in the same manner it was generated above, for example, based on a secret key, the same cryptographic technique used by the ACS, and the account number, the DSN, the log amount, and the truncated hash of the merchant ID, or other data, etc. Additionally, or alternatively, the issuer 103 may be configured to leverage one or more network services (via the payment network 106, for example) that has already validated the AAV (as indicated by the validation result), in order to approve the transaction. The issuer 103 may be configured to validate the transaction amount (i.e., the amount indicated in the authorization request) based on the log amount from the AAV (or, optionally, the uncompressed amount), and also the transaction merchant (i.e., the merchant indicated in the authorization request) based on the truncated hash of the merchant ID from the AAV, etc.

Once a determination is made, the issuer 103 is configured to transmit an authorization response (including the customer's account number) back to the payment network 106. In turn, the payment network 106 is configured to route the authorization response (including the token or the account number) back to the acquirer. The acquirer, in turn, is configured to provide the authorization response (including the token or the account number) back to the merchant 102.

At this point, the transaction is approved (in this example) and the merchant 102 may direct the selected product to be delivered to the customer 101.

As described above, in the system 100 the static token is passed multiple times between the entities over the network 107, which is often an unsecure network. Moreover, the token is stored by either the merchant 102 or the customer 101. A fraudster can intercept the token while it is being transmitted over the network 107 or can hack into the merchant 102 or the computing device 104 to obtain the stored token. This could therefore make the transaction less secure.

To overcome this issue, according to the invention, firstly the merchant 102 (or the computing device 104) only stores a token reference for a static token generated for the customer PAN. The token reference is not functionally equivalent to a token as it cannot be used to authorize a transaction. Secondly, the merchant requests a dynamic ultra-low value token from the DSS 105 every time a transaction is made by the customer 101. The dynamic ultra-low value token thus has value only in connection with one specific transaction, and cannot be used to authorize further transactions.

The stored token reference is used for identifying the customer 101. However, as the actual token used for the transaction is not stored, a fraudster cannot make a fraudulent transaction even if he/she hacks the merchant 102 or the computing device 104. The dynamic token generated by the DSS 105 is an ultra-low value token and cannot be used for making a transaction by a fraudster. The generation of the ultra-low value token is described below with reference to FIG. 2.

Figure 2:
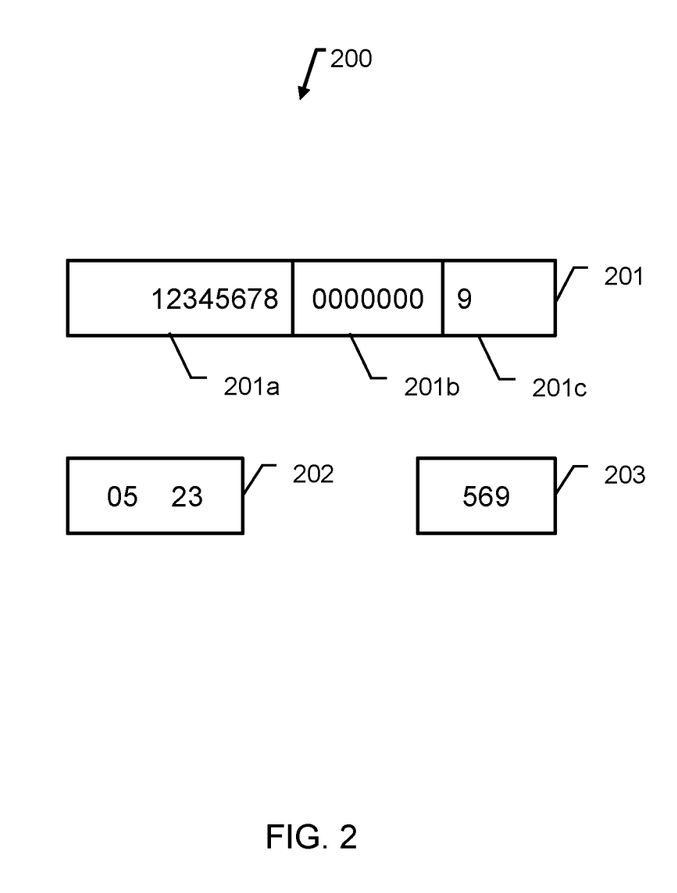
FIG. 2 shows a format of an ultra-low value token replacing sensitive data in the system of FIG. 1.

FIG. 2 shows an exemplary ultra-low value token 200 as generated by the DSS 105 in response to a transaction made by the customer 101 to the merchant 102. In the present example, the token 200 is generated in a format such that it appears to be genuine user credentials to mislead a fraudster.

Typically, a user card has a 16-digit PAN, an expiry date (MM/YY) and a three digit CVV number. A fraudster may thus expect a string of characters matching this pattern to be payment card details, and would not expect that in fact a token is encoded within this information. A static token generated by the merchant 102 or obtained by the DSS 105 is obtained by randomizing a PAN, for example. The randomizing may be done in accordance with set rules defined in 3-D secure standard, for example. The DSS 105 preferably uses the static token to generate the token 200 according to an ad hoc logic. In accordance with the invention, the 16-digit number 201 for the token 200 is transmitted over network 107 by splitting the static token into three parts and padding with random numbers to simulate the pattern of a payment card data transmission. For illustration, let's assume the 16-digit static token number to be 1234-5678-9876-5432. This may be transmitted over the network in the following format, as also shown in FIG. 2, where commas indicate different fields of an electronic message or a plurality of electronic messages:

1234567800000009, 0523, 569

This has the appearance of a data structure typically associated with a payment card, e.g. {16-digit PAN}, {4-digit expiry date}, {3-digit Card Code Verification, CCV}. However, merchant 102 and/or computing device 104 are aware of this encoding scheme and are able to extract token 200 from the electronic message(s) as follows. The first part 201a of the dynamic token 200 may be contained within the first 8 digits of the static token's card number unchanged. The second part 20b may contain seven zeroes or any other random digits. The third part 200c of the token 200 may contain the last digit of the static token. For token expiry field 202, any four digits of the static token could be taken and randomly arranged to form a meaningful expiry date. As for the CVV field 203, any random three digits of the static token can be used to form the CVV number.

The remaining elements of the token, 202 and 203, are encoded within the final value of the PAN field, 201, and the expiry date and CCV fields of the electronic message, respectively. Under this exemplary encoding scheme, token 200 can thus be recovered by concatenating the first seven digits contained within the PAN field of the static token, the final digit within the PAN field, the expiry date field and the CCV field. It will be appreciated that this encoding scheme is purely exemplary, and that any encoding scheme that functions within the constraints of the fields available in an electronic message associated with a payment card can alternatively be used to disguise token 200. Preferably, the encoding scheme includes a dynamic element, e.g. the values contained in the expiry date and/or CCV fields can correspond to different positions within the token 200 each time. E.g. the first value of the CCV field could be the first value of the token on one occasion, and the seventh value of the token on another occasion.

This logic is stored by the DSS 105 in its memory and is used to verify the token sent back to it by the merchant 102/directory server and to obtain the static token. The transaction is then completed using the sensitive data associated with the static token over a secure link between the DSS 105 and the issuer 103 and/or the payment network 106. In this way, the transaction is securely completed by minimizing the risk of fraud using the ultra-low value token.

The token 200 is generated for each new transaction, whether it is directly initiated by the customer 101 or is a recurring transaction made by the merchant 102. The ad hoc logic used by the DSS 105 for generating the token 200 preferably changes for each transaction. However, only one or two parameters may change while others could remain the same. For example, the card number 201 may remain the same for a set number of transactions but the expiry date and CVV fields may be changed for each transaction. To enhance the security further, the token 200 may have a preset expiry period after which it cannot be used to process the transaction and the merchant 102 must request another token from the DSS 105.

Figure 4:
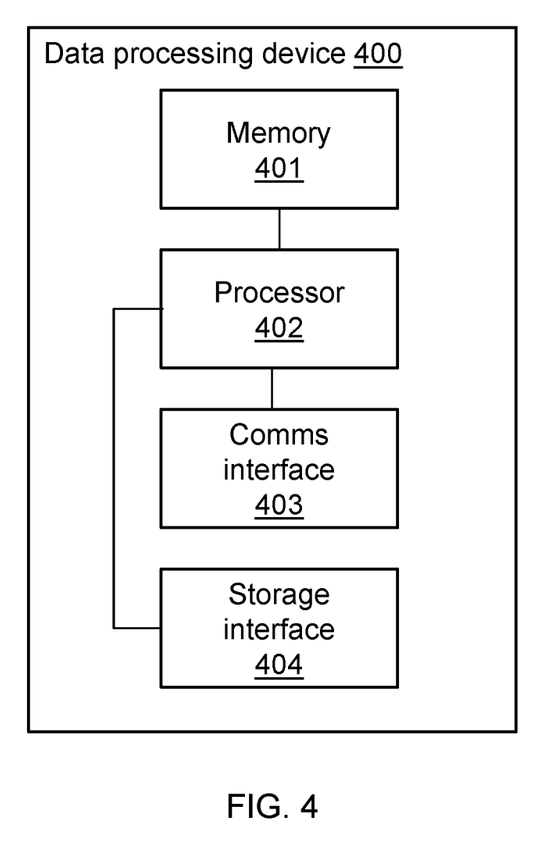
FIG. 4 shows in schematic form a data processing device that is suitable for performing the functions of any data processing device within the system of FIG. 1.

It will be appreciated that each of the issuer 103, the merchant 102, the computing device 104, the DSS 105, the directory server, the ACS, the acquirer, and the payment network 106, etc., are implemented herein in one or more computing devices, such as a computing or data processing device 400 illustrated in FIG. 4. In connection therewith, the one or more computing devices are each in communication with one or more other entities via at least one network. In general, each of the paths included in FIG. 1, along which, or via which, messages are exchanged in the above description are representative of the network(s). The network(s) may include, without limitation, one or more local area networks (LANs), wide area networks (WANs) (e.g., the internet, etc.), mobile networks, virtual networks, other networks as described herein, and/or other suitable public and/or private networks capable of supporting communication among two or more of the illustrated parts, or even combinations thereof. In one example, a network includes multiple networks, where different ones of the multiple networks are accessible to different ones of the illustrated components in FIG. 1. In particular, the payment network 106 and the DSS 105 may be connected via a private network and, separately, the merchant 102 and the computing device 104 may be connected through a public network, such as the internet.

Figure 3A:
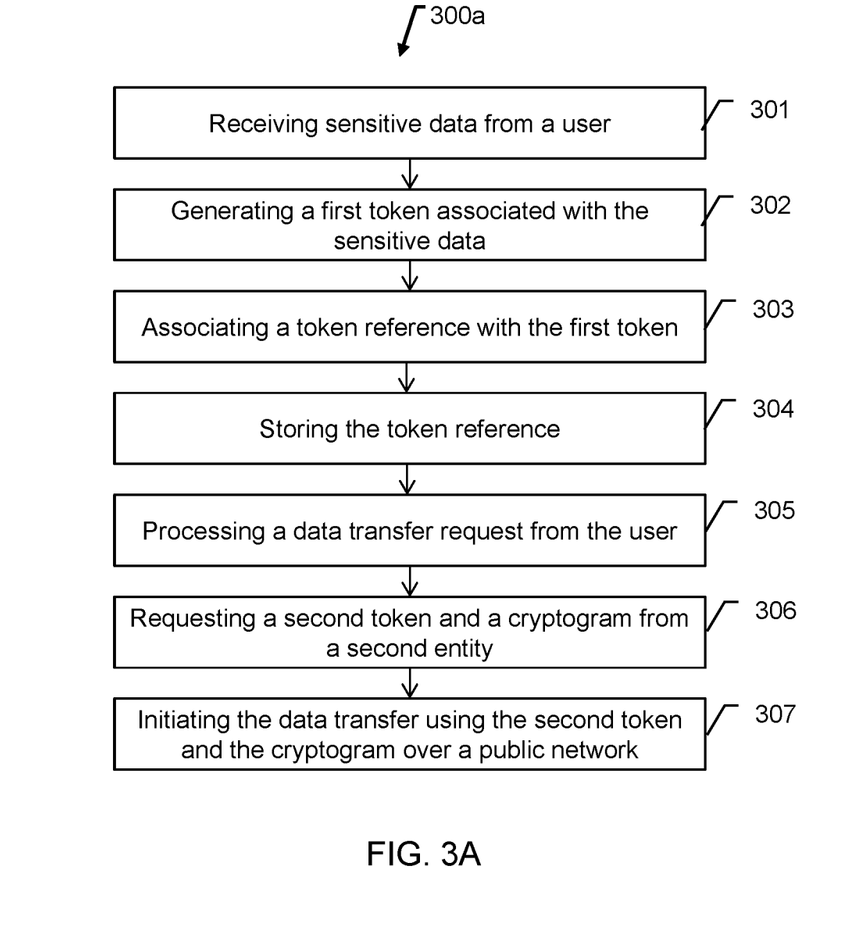
FIGS. 3A-3C are flow diagrams for a process of authenticating and approving a transaction between the customer and the merchant in the system of FIG. 1.

FIG. 3A shows a process 300a in a method of processing a transaction securely, the process 300a comprising the steps primarily performed by the merchant 102. It is to be understood that not all steps are shown in the process 300a for the sake of simplicity.

At step 301, the merchant 102 receives sensitive data from the customer 101. In this example, the customer 101 holds an account with the issuer 103 and has been given an primary account number, PAN, and a related card with a unique card number, expiry date, and CVV number. These are collectively referred to as the sensitive data. When the customer 101 buys a product or a service from the merchant 102, the merchant requests the customer 101 to provide the sensitive data in order to process the payment for the bought product or service. The customer 101 may enter the sensitive data via the computing device 104 or retrieve stored data in the computing device 104. If the customer 101 has an existing account with the merchant 102, the merchant 102 may already have the customer sensitive data securely stored.

At step 302, the merchant 102 generates a first token associated with the received sensitive data. In the present example, the merchant 102 is associated with a tokenization platform which may be managed directly by the merchant 102. Alternatively, the merchant 102 may request a token from the DSS 105. The first token is a static token generated by randomizing the sensitive data of the customer 101; this may be referred to as 'tokenisation' of the sensitive data. The first token is later used for processing the transaction.

At step 303, the merchant 102 associates the first token with a token reference. In this example, after generating or receiving the first token, the merchant 102 creates a token reference for the first token for identifying the customer 101 using the token reference. The token reference can be any numeric, alphabetical, or alphanumeric value or code unique to the customer 101.

At step 304, the merchant 102 stores the token reference in association with the received sensitive data. In the present example, the merchant 102 stores the token reference for use during the transaction. As the token reference itself cannot be used for processing a transaction, it is safe to store it in a relatively unsecure location (e.g. on a Cloud) and to be shared over the public network 107. It is to be noted that the customer sensitive data or the static token are stored safely elsewhere by the merchant 102 and are not shared over the public network 107.

At step 305, the merchant 102 processes a data transfer request from the customer 101. In the present example, when the customer 101 makes a purchase from the merchant 102, it is necessary for the sensitive data to be transmitted to the issuer 103. However, the merchant 102 does not directly send the sensitive data to the issuer 103 but instead uses the token reference to initiate the transaction authentication process.

At step 306, the merchant 102 requests a second token and a cryptogram from the DSS 105. In the present example, the merchant 102 sends the token reference to the DSS 105 over the network 107 to request for generation of an ultra-low value token, such as the token 200, and a dynamic cryptogram for processing the transaction securely.

At step 307, the merchant 102 initiates the data transfer using the second token and the cryptogram over the network 107. In the present example, the merchant 102 uses the ultra-low value token 200 and the dynamic cryptogram received from the DSS 105 to initiate the transaction authentication over the network 107 without having to share the static token. As explained above, the token 200 is generated using the ad hoc logic by the DSS 105 and is made to look like the actual customer sensitive data to mislead a potential fraudster. A fraudster intercepting token 200 cannot use it for subsequent transactions, as it is valid only for a given transaction. Additionally, neither token 200 nor the token reference can be used to retrieve the first token or the sensitive data itself. Therefore, token 200 is of very low value to a fraudster.

Figure 3B:
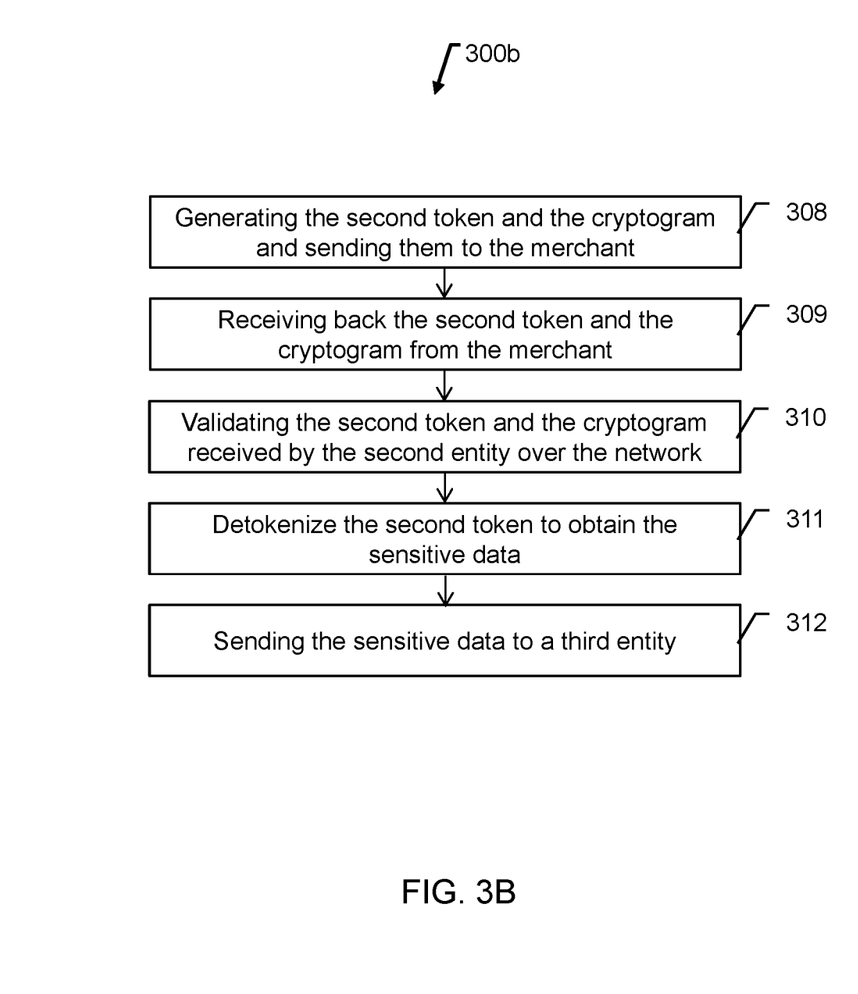

FIG. 3B shows a process 300*b* in a method of processing a transaction securely, the process 300*b* comprising the steps primarily performed by the DSS 105. It is to be understood that not all steps are shown in the process 300*b* for the sake of simplicity.

At step 308, the DSS 105 generates the second token and the cryptogram and sends them to the merchant 102. In the present example, the DSS 105 receives a request from the merchant 102 for generating the token 200 and a dynamic cryptogram based on the token reference. The DSS 105 is configured to validate the credentials of the merchant 102 and identify the customer 101 from the token reference. The DSS 105 can then retrieve the static token for the customer 101 and generate the token 200 using that, as described above with reference to FIG. 2. The DSS 105 also generates the dynamic cryptogram to secure the transaction. The DSS 105 then sends the generated token 200 and the dynamic cryptogram to the merchant 102 over the network 107. It is to be noted that for every new request received by the DSS 105 from the merchant 102, the DSS 105 generates a new ultra-low value token and a dynamic cryptogram.

At step 309, the DSS 105 receives back the second token and the cryptogram from the merchant 102. In the present example, the merchant 102 attaches the received token 200 and the dynamic cryptogram in a transaction approval request and sends that over the network 107 where it may be shared with several entities such as the directory server, the acquirer, etc. before being received back by the DSS 105.

At step 310, the DSS 105 validates the second token and the cryptogram. In the present example, the DSS 105 determines whether the token 200 and/or the dynamic cryptogram generated by it has been tampered with over the network 107. This is done by matching the received token against the logic stored in the memory of the DSS 105 and decrypting the cryptogram. The DSS 105 also verifies if the token 200 is within the preset expiry period. If the token 200 and/or the cryptogram is not valid or the token has expired, the DSS 105 rejects the transaction request and the merchant 102 may need to request a new token and/or a cryptogram from the DSS 105.

At step 311, the DSS 105 detokenizes the second token to obtain the sensitive data. In the present example, the DSS 105 detokenizes the ultra-low value token 200 using the stored logic to retrieve the static token. The DSS 105 then retrieves the sensitive data mapped to the static token. The sensitive data for the customer 101 is obtained by the DSS 101 in this way without the merchant 101 having to send it over the public network 107.

At step 312, the DSS 105 sends the sensitive data to the issuer 103. In the present example, as the issuer 103 only recognizes the customer using the sensitive data and uses that to approve the transaction, the DSS 105 sends the retrieved sensitive data to the issuer 103. It is to be noted that the DSS 105 and the issuer 103 are connected over a secure link such as VPN or trusted channel and therefore the sensitive data can be safely transferred from the DSS 105 to the issuer 103 without the risk of being tampered or misappropriated.

Figure 3C:
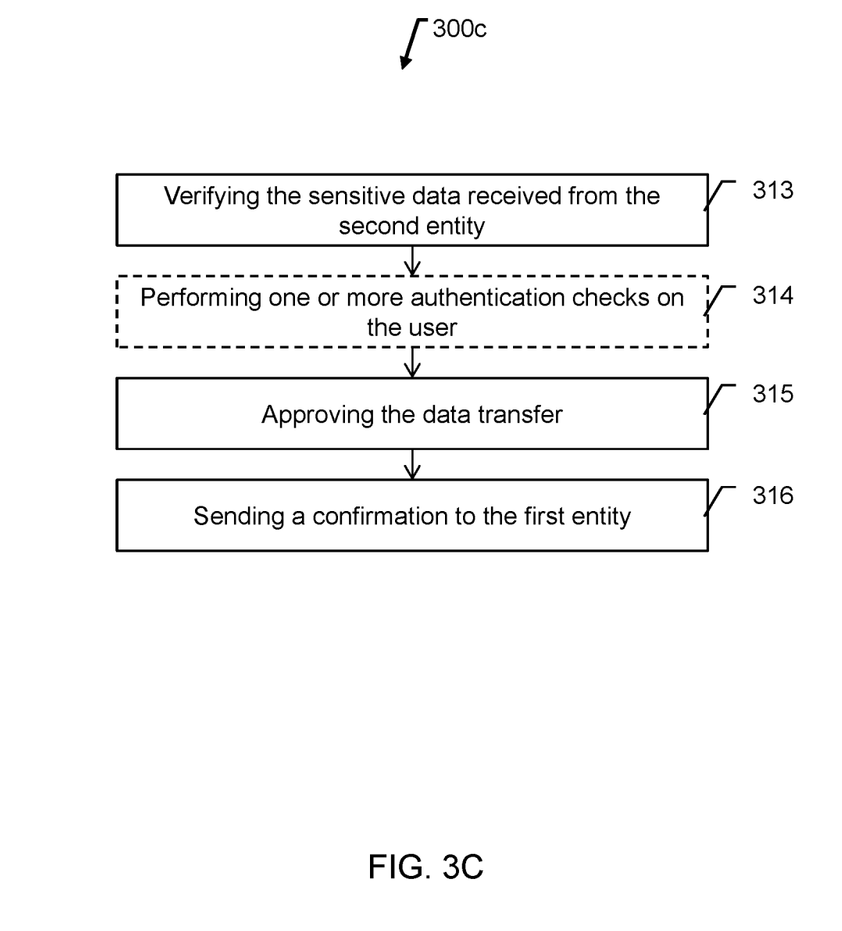

FIG. 3C shows a process 300*c* in a method of processing a transaction securely, the process 300*c* comprising the steps primarily performed by the issuer 103. It is to be understood that only not all steps are shown in the process 300*c* for the sake of simplicity.

At step 313, the issuer 103 verifies the sensitive data received from the DSS 105. In the present example, the issuer 103 or the ACS (managed by the issuer) verifies the customer PAN and other details contained in the sensitive data by matching it against the record of the customer 100 maintained by the issuer 103. The issuer 103 may also review the credentials of the merchant 102, the transaction amount, etc. to determine the risk of the transaction.

At step 314, optionally, the issuer 103 performs one or more authentication checks on the customer 101. In the present invention, if the issuer 103 suspects that the transaction may be fraudulent e.g. due to an unknown merchant or high transaction amount, the issuer 103 confirms the identity of the customer 101 before approving the payment. The issuer 103 may send a one-time password (OTP) to a registered mobile number of the customer 101, which the customer 101 needs to send back to the issuer 103, e.g. using the computing device 104. Alternatively, or in addition, the issuer 103 may pose one or more security questions to the customer 101 such as confirming his or her date of birth, home postcode, etc.

At step 315, the issuer 103 approves the data transfer. In the present example, the issuer 103 approves the transaction after verifying the user credentials and assuring that the transaction is genuine. After approving the transaction, the issuer 103 may transfer the funds into the merchant's account held by the acquirer through the payment server 106. As the sensitive data is not transferred over the public network 107 during the transaction authentication process, the likelihood of fraud is minimized and the issuer 103 can approve the transaction with greater confidence.

At step 316, the issuer 103 sends a confirmation to the merchant 102. In the present example, after the issuer 103 has approved the transaction, it sends a confirmation message to the merchant 102 as well as to customer 101. The merchant 102 in turn may also send a confirmation to the customer 101 notifying a successful transaction.

It will be appreciated that any of the methods described herein, and any particular step of said methods, can be implemented by a computer. Such implementation may take the form of a processor executing instructions stored on a non-transitory computer-readable medium or media, wherein when executed the instructions cause the processor to perform any one or more steps of any of the methods described herein. Individual steps of a method may be implemented by different processors that are all collectively acting in accordance with computer-readable instructions stored on one or more storage media. The processor or processors may be component(s) of system 100, for example a processor of the merchant 102, the DSS 105, or the issuer 103. Equally, any steps of any of the methods described herein may be performed by data processing devices as described in respect of system 100 of FIG. 1. By way of example, FIG. 4 shows in schematic form a data processing device 400 that is suitable for performing the functions of the processing devices and servers in the system 100.

Data processing device 400 includes a processor 402 for executing instructions. Instructions may be stored in a memory 401, for example. Processor 402 may include one or more processing units (e.g., in a many-core configuration) for executing instructions.

Processor 402 is operatively coupled to a communication interface 403 such that data processing device 400 is capable of communicating with a remote device, such as another data processing device of system 100. For example, communication interface 403 may receive communications from another member of system 100 over the network, depending on the function of data processing device 400 within the context of system 100.

Processor 402 may also be operatively coupled to a storage device such as secure storage medium, depending on the function of data processing device 400 within the context of system 100. The storage device is any computer-operated hardware suitable for storing and/or retrieving data, where in the case of a secure storage medium the data is stored and retrieved securely.

Storage device can be integrated in data processing device 400, or it can be external to data processing device 400 and located remotely. For example, data processing device 400 may include one or more hard disk drives as a storage device. Alternatively, where the storage device is external to data processing device 400, it can comprise multiple storage units such as hard disks or solid state disks in a redundant array of inexpensive disks (RAID) configuration. The storage device may include a storage area network (SAN) and/or a network attached storage (NAS) system.

Processor 402 can be operatively coupled to the storage device via a storage interface 404. Storage interface 404 is any component capable of providing processor 402 with access to the storage device. Storage interface 404 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to the storage device.

Memory 401 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure has been described in terms of various specific embodiments, those skilled in the art will recognize that the disclosure can be practiced with modification within the scope of the claims.

As used herein, the term "non-transitory computer-readable media" is intended to be representative of any tangible computer-based device implemented in any method or technology for short-term and long-term storage of information, such as, computer-readable instructions, data structures, program modules and submodules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is enabling sensitive data such a cryptogram to be passed to the devices in a secure manner. Any such resulting program, having computer-readable code means, may be embodied or provided within one or more computer readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

The invention claimed is:

1. A method of processing a data transfer request securely over a network, the method comprising the steps of:
   obtaining, by a first entity, a first token associated with sensitive data received from a user;

generating a token reference associated with the first token and storing the token reference, wherein the token reference is generated after obtaining the first token;

sending the token reference to a second entity;

requesting a second token from a second entity upon receiving a data transfer request from a third entity, wherein the second token is based on the token reference and is derived using an ad hoc logic;

processing the data transfer request using the second token;

detokenizing, by the second entity, the second token to retrieve the sensitive data; and sending, by the second entity, the sensitive data to a fourth entity configured to approve the data transfer request.

2. The method of claim 1, further comprises requesting a cryptogram from the second entity when requesting the second token.

3. The method of claim 2, further comprising the steps of:

sending, by the first entity, the second token and the cryptogram over a public network; and validating, by the second entity, the second token and the cryptogram received over the public network.

4. The method of claim 3, wherein the fourth entity is configured to authenticate the user before approving the data transfer request.

5. The method of claim 4, further comprises sending, by the fourth entity, a confirmation of approval of the data transfer request to the first entity and/or the third entity.

6. The method of claim 1, wherein the second token comprises data transmitted in an electronic message having a card number, an expiry date and a CVV field.

7. The method of claim 1, wherein the ad hoc logic comprises splitting the first token into three parts and masking at least two of the three parts to generate the second token.

8. The method of claim 1, wherein the second entity is configured to store the ad hoc logic and update it each time the second token is generated.

9. The method of claim 1, wherein the second token has a predefined expiry period.

10. The method of claim 1, further comprising the second entity verifying credentials of the first entity before issuing the second token.

11. A system for processing a data transfer request securely over a network, the system comprising a first entity configured to:

generate a first token associated with sensitive data received from a user;

generate a token reference associated with the first token and store the token reference, wherein the token reference is generated after obtaining the first token;

send the token reference to a second entity;

request a second token from a second entity upon receiving a data transfer request from the user, the second token is based on the token reference and has been derived using an ad hoc logic;

process the data request using the second token;

detokenize, by the second entity, the second token to retrieve the sensitive data; and send, by the second entity, the sensitive data to a fourth entity configured to approve the data transfer request.

12. The system of claim 11, wherein the first entity is further configured to receive a cryptogram and the second token from the second entity, and to send the second token and the cryptogram over a public network.

13. The system of claim 11, wherein the first entity is a merchant and the second entity is a tokenization platform.

14. The system of claim 11, wherein the data transfer request is a payment transaction between a merchant and a user.

* * * * *